W. C. THEDE.
WHEEL HUB.
APPLICATION FILED MAY 31, 1905.
921,912.
Patented May 18, 1909.
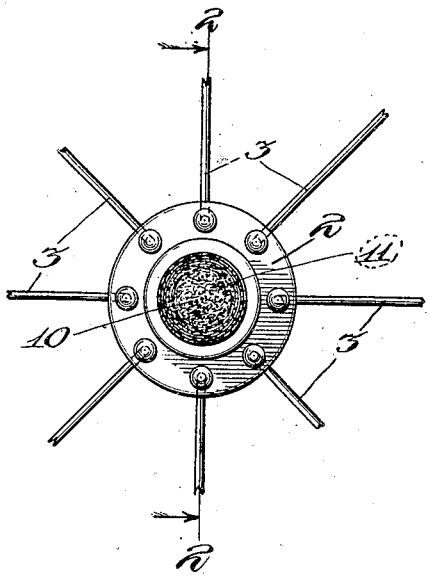
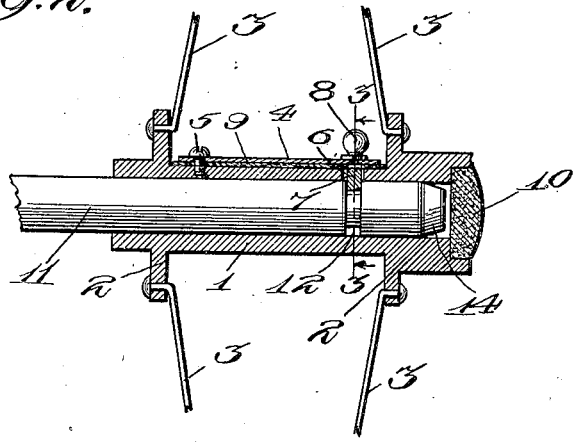
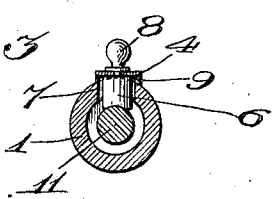
Witnesses:
M. Duplessis
J. C. Lee
Inventor:
William C. Thede
by: A. Miller Belfield
Atty.

UNITED STATES PATENT OFFICE.

WILLIAM C. THEDE, OF CHICAGO, ILLINOIS.

WHEEL-HUB.

No. 921,912.  Specification of Letters Patent.  Patented May 18, 1909.

Application filed May 31, 1905. Serial No. 262,983.

*To all whom it may concern:*

Be it known that I, WILLIAM C. THEDE, a citizen of the United States, residing at Chicago, in the county of Cook and State of Illinois, have invented a certain new and useful Improvement in Wheel - Hubs, of which the following is a full, clear, concise, and exact description, reference being had to the accompanying drawings, forming a part of this specification.

My invention relates to wheel hubs, and its principal object is to provide a simple, inexpensive and effective device for automatically locking the hub to the axle so as to permit the wheel to rotate, but to prevent its sliding or working off of the axle.

In the accompanying drawings, Figure 1 is a side elevation of a wheel hub having a locking device embodying my invention; Fig. 2 is a vertical section taken on line 2—2 in Fig. 1; Fig. 3 is a cross section taken on line 3—3 in Fig. 2.

In the drawings I have shown a wheel hub consisting of a barrel 1 having two flanges 2, 2 to which spokes 3, 3 are attached. The barrel 1 is provided with a spring clip 4 secured at one end as by a screw 5 and having at its free end a pin 6 which extends through an aperture 7 in the barrel 1. A knob 8 is secured to the free end of the strip 4. A layer of leather 9 is arranged on the under side of the spring strip 4. A plug 10 preferably of hard rubber or similar material, is fitted into the outer end of the hub.

Inside of the barrel 10 is arranged the axle 11 which is provided near its end with an annular recess or groove 12 adapted to receive the pin 6 on the spring clip 4. The end 14 of the axle is beveled or inclined.

The operation of the device is as follows. The hub is slipped over the axle and when this is done the pin 6 will slide up on the inclined end 14 and slide along the axle until the annular groove 12 is reached, whereupon it will drop into said groove. This locks the hub against movement longitudinally to the axle to permit it to rotate freely thereon, the pin 6 traveling around in the recess 12. The leather facing 9 causes a tight fit to be made between the strip 4 and the hub, and thereby prevents the entry of dirt or dust into the interior of the hub through the aperture 7. When desired to remove the wheel from the hub, the pin 6 is withdrawn from the annular recess 12 by grasping the knob 8, and then the hub is slipped off from the axle.

It will be seen that this device, while possessing a high degree of efficiency and effectiveness, is nevertheless exceedingly simple and inexpensive and easy to construct and apply. By providing the device on the hub itself instead of on a nut or cap, the hub itself is locked and held and the use of a nut or cap is dispensed with. It will also be seen that by inclining the end of the axle, the locking pin automatically slides along the axle and drops into its place, so that it becomes locked automatically,—that is without the use of the hands. It will also be seen that the hub is tightly closed so that dust and dirt cannot gain access to its interior.

It will be understood that changes and modifications can be made without departing from the spirit of my invention.

What I claim is:—

The combination with a hub having separate spoke flanges, and an aperture between the same, of a flat spring arranged along-side of the hub between said flanges, and having one end secured to said hub, a pin carried by the other end of said spring and extending through the aperture in said hub, a leather gasket mounted along-side of said spring to prevent dust from entering through said aperture, an axle having an annular groove adapted to receive said pin and also having its end tapered so as to permit the pin to slide up the incline when the hub is slipped upon the axle, and a rubber closure inserted within the open end of said hub.

In witness whereof, I hereunto subscribe my name this 23d day of May A. D., 1905.

WILLIAM C. THEDE.

Witnesses:
 A. MILLER BELFIELD,
 I. C. LEE.